(12) United States Patent
Ahn et al.

(10) Patent No.: US 8,705,397 B2
(45) Date of Patent: Apr. 22, 2014

(54) METHOD AND APPARATUS OF CONTROLLING TRANSMISSION POWER

(75) Inventors: Joon Kui Ahn, Anyang-si (KR); Jung Hoon Lee, Anyang-si (KR); Suck Chel Yang, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 13/148,071

(22) PCT Filed: Jan. 11, 2010

(86) PCT No.: PCT/KR2010/000146
§ 371 (c)(1),
(2), (4) Date: Aug. 5, 2011

(87) PCT Pub. No.: WO2010/123190
PCT Pub. Date: Oct. 28, 2010

(65) Prior Publication Data
US 2011/0292826 A1    Dec. 1, 2011

Related U.S. Application Data

(60) Provisional application No. 61/171,834, filed on Apr. 22, 2009.

(30) Foreign Application Priority Data

Nov. 25, 2009  (KR) .................. 10-2009-0114527

(51) Int. Cl.
*H04W 24/00*    (2009.01)

(52) U.S. Cl.
USPC ......................................... 370/252

(58) Field of Classification Search
USPC .......... 370/328–332, 252, 315; 455/501, 509, 455/522
See application file for complete search history.

(56) References Cited

U.S. PATENT DOCUMENTS

| 2004/0081076 A1* | 4/2004 | Goldstein et al. ............. 370/208 |
| 2007/0206523 A1 | 9/2007 | Huynh et al. |
| 2010/0091724 A1* | 4/2010 | Ishii et al. ..................... 370/329 |

FOREIGN PATENT DOCUMENTS

| KR | 10-2004-0044033 A | 5/2004 |
| KR | 10-2004-0090569 A | 10/2004 |
| KR | 2003-0055413 A | 10/2004 |

OTHER PUBLICATIONS

3GPP TSG RAN WG1 #56bis, UL Transmission Power Control in LTE-A, Mar. 23-27, 2009, Samsung, 56bis, # of p. 5.*
3GPP TSG, UL Transmission Power Control in LTE-A, Mar. 23-27, 2009, Samsung, #56bis.*

* cited by examiner

*Primary Examiner* — Jae Y. Lee
*Assistant Examiner* — Jean F Voltaire
(74) *Attorney, Agent, or Firm* — Birch, Stewart, Kolasch & Birch, LLP

(57) ABSTRACT

A method of transmitting signals from a transmitter of a wireless communication system comprises determining each transmission power of a first signal and a second signal; if the difference Y in transmission power between the first signal and the second signal exceeds a predetermined value X, adjusting at least one of the transmission powers of the first signal or the second signal so as not to allow the difference in adjusted transmission power to exceed the predetermined value; and simultaneously transmitting the first signal and the second signal to a receiver using the adjusted transmission power.

8 Claims, 18 Drawing Sheets

FIG. 2
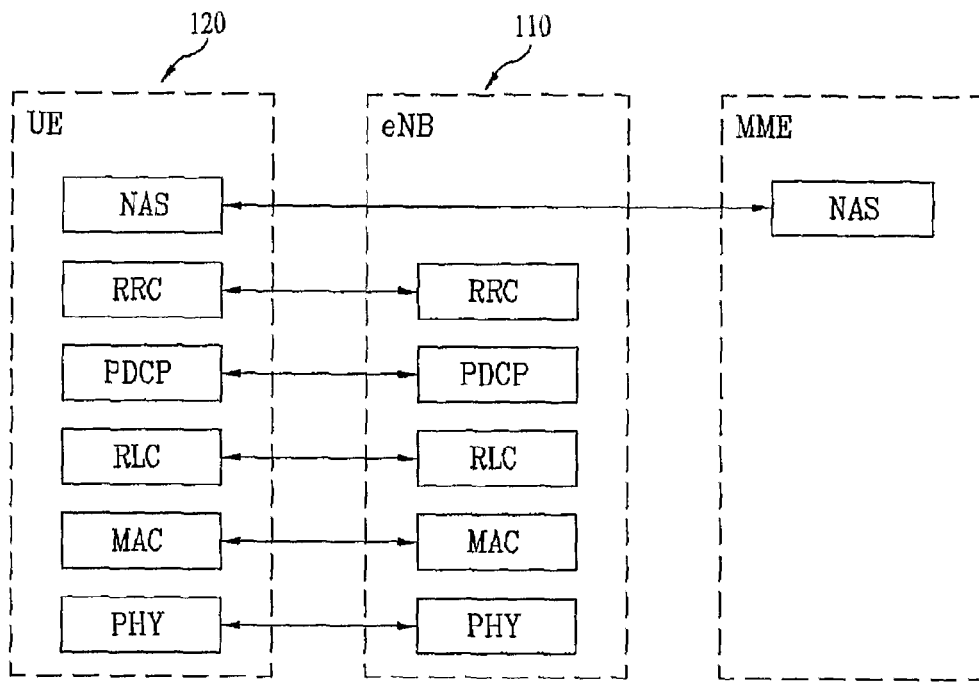
(a) Control-plane protocol stack
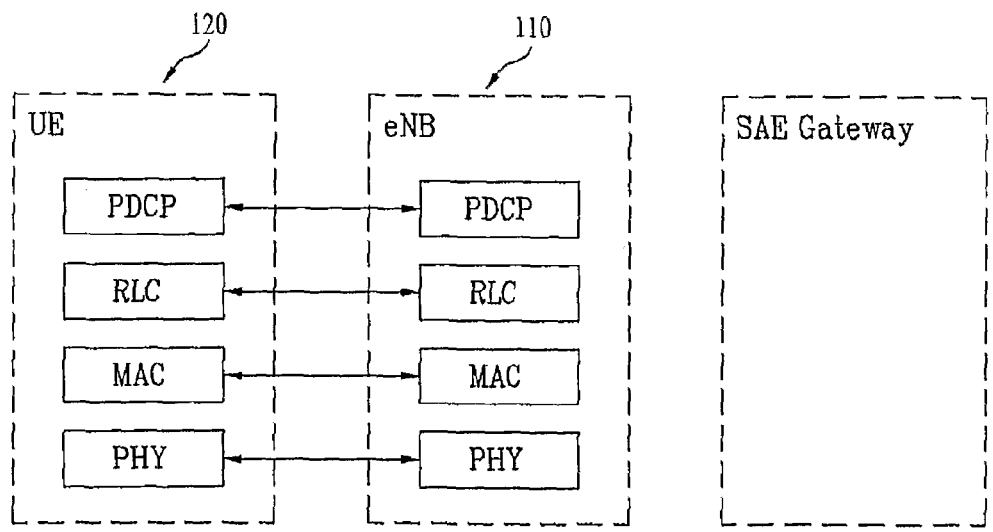
(b) User-plane protocol stack Single component carrier (e.g. LTE system)

PUCCH format 1a and 1b structure (normal CP case)

FIG. 13

Exemplary transmission of multiple signals in Uplink

|        | Single or multiple component carriers |
|--------|---------------------------------------|
| Case 1 | A plurality of PUCCHs                 |
| Case 2 | A plurality of PUSCHs                 |
| Case 3 | A plurality of SRSs                   |
| Case 4 | A combination of PUCCH and PUSCH      |
| Case 5 | A combination of PUCCH and SRS        |
| Case 6 | A combination of SRS and PUSCH        |
| Case 7 | A combination of PUCCH, PUSCH and SRS |

METHOD AND APPARATUS OF CONTROLLING TRANSMISSION POWER

This application is a National Phase of PCT/KR2010/000146 filed on Jan. 11, 2010, which claims priority under 35 USC 119(e) to U.S. Provisional Application No. 61/171,834 filed Apr. 22, 2009 and under 35 USC 119(a) to Patent Application No. 10-2009-0114527 filed in Republic of Korea, on Nov. 25, 2009, all of which are hereby expressly incorporated by reference into the present application.

DETAILED DESCRIPTION OF THE INVENTION

1. Technical Field

The present invention relates to a wireless communication system, and more particularly, to a method and apparatus of controlling transmission power of a plurality of signals.

2. Background Art

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DESCRIPTION OF THE INVENTION

Technical Problems

An object of the present invention is to provide a method and apparatus of efficiently controlling transmission power when a plurality of signals are transmitted from a wireless communication system.

Another object of the present invention is to provide a method and apparatus of preventing receiving performance from being deteriorated due to high power difference among a plurality of signals when the plurality of signals are transmitted.

It is to be understood that objects to be achieved by the present invention are not limited to the aforementioned objects and other objects which are not mentioned will be apparent from the following description to the person with an ordinary skill in the art to which the present invention pertains.

Technical Solutions

To achieve the aforementioned objects of the present invention, in one aspect of the present invention, a method of transmitting signals from a transmitter of a wireless communication system comprises determining each transmission power of a first signal and a second signal; if the difference Y in transmission power between the first signal and the second signal exceeds a predetermined value X, adjusting at least one of the transmission powers of the first signal or the second signal so as not to allow the difference in adjusted transmission power to exceed the predetermined value; and simultaneously transmitting the first signal and the second signal to a receiver using the adjusted transmission power.

In another aspect of the present invention, a user equipment of a wireless communication system comprises a radio frequency (RF) unit configured to transmit and receive a radio signal to and from a base station; a memory storing information transmitted to and received from the base station and parameters required for an operation of the user equipment; and a processor connected with the RF unit and the memory, controlling the RF unit and the memory for the operation of the user equipment, wherein the processor performs a method of transmitting a signal, the method including: determining each transmission power of a first signal and a second signal; if the difference Y in transmission power between the first signal and the second signal exceeds a predetermined value X, adjusting at least one of the transmission powers of the first signal or the second signal so as not to allow the difference in adjusted transmission power to exceed the predetermined value; and simultaneously transmitting the first signal and the second signal to the base station using the adjusted transmission power.

The first signal and the second signal are respectively transmitted through one or more single carrier frequency division multiple access (SC-FDMA) symbols.

The first signal and the second signal respectively include separate reference signals.

The first signal and the second signal respectively include any one of a physical uplink shared channel (PUSCH) signal, a physical uplink control channel (PUCCH) signal, and a sounding reference signal (SRS).

The transmission power of any one having the greater transmission power from the first signal and the second signal is adjusted to a sum of the transmission power of the other signal and the predetermined value.

The transmission power of any one having the less transmission power from the first signal and the second signal is adjusted to a value obtained by subtracting the predetermined value from the transmission power of the other signal.

The transmission power of any one having the greater transmission power from the first signal and the second signal is adjusted to decrease by 'a' and the transmission power of the other signal is adjusted to increase by 'Y-X-a' ('a' is a real number of 0 to Y-X).

Advantageous Effects

According to the embodiments of the present invention, it is possible to prevent receiving performance from being deteriorated due to high power difference among a plurality of signals when the plurality of signals are transmitted.

It is to be understood that the advantages that can be obtained by the present invention are not limited to the aforementioned advantage and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating a structure of a radio interface protocol between a user equipment and E-UTRAN based on the 3GPP radio access network standard;

FIG. 13 is a diagram illustrating an example that a plurality of signals are transmitted in accordance with the embodiment of the present invention;

BEST MODE FOR CARRYING OUT THE INVENTION

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

Figure 1:
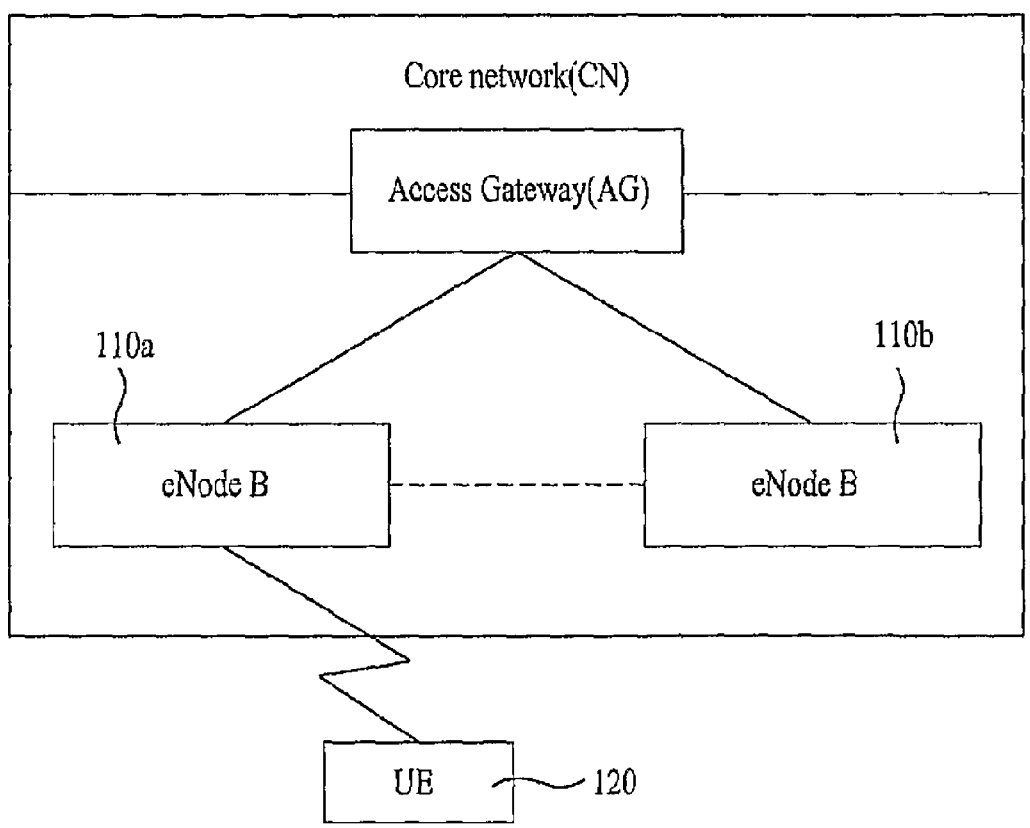
FIG. 1 is a diagram illustrating a network structure of an Evolved Universal Mobile Telecommunications System (E-UMTS)

FIG. 1 is a diagram illustrating a network structure of an Evolved Universal Mobile Telecommunications System (E-UMTS). The E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to a corresponding user equipment to notify the corresponding user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, HARQ. A Core Network (CN) may include the AG and a network node or the like for user registration of the UE. The AG manages mobility of a UE on a Tracking Area (TA) basis, wherein one TA includes a plurality of cells.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical (PHY) layer as the first layer provides an information transfer service to an upper layer using a physical channel. The physical (PHY) layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC layer) above the MAC layer via logical channels. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer (L2) performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message.

Figure 3:
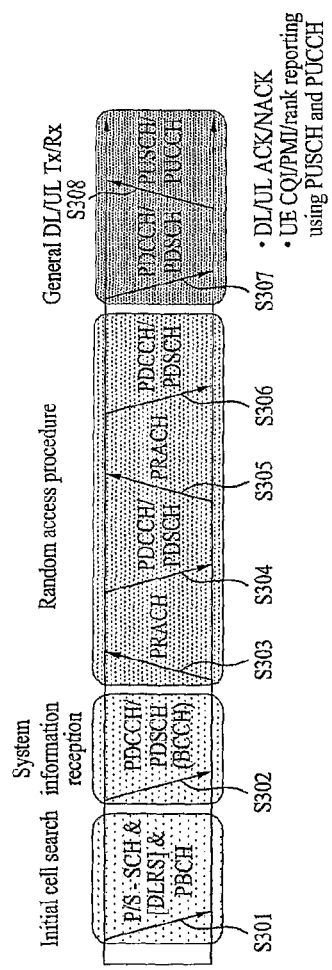
FIG. 3 is a diagram illustrating a physical channel used in an LTE system and signal transmission using the physical channel.

FIG. 3 is a diagram illustrating a physical channel used in an LTE system and signal transmission using the physical channel.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station.

The user equipment which has finished the initial cell search can acquire more detailed system information by receiving a physical downlink control channel (PDSCH) in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a random physical random access channel (PRACH) (S303 and S305), and receives a response message to the preamble through the PDCCH and a PDSCH corresponding to the PDCCH (S304 and S306). In case of a contention based RACH, a contention resolution procedure can be performed additionally.

The user equipment which has performed the aforementioned steps receives the PDCCH/PDSCH (S307) and transmits a physical uplink shared channel (PUSCH) and a physical uplink control channel (PUCCH) (S308), as a procedure of transmitting general uplink/downlink signals. The control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment transmits control information of the aforementioned CQI/PMI/RI through the PUSCH and/or the PUCCH.

Figure 4:
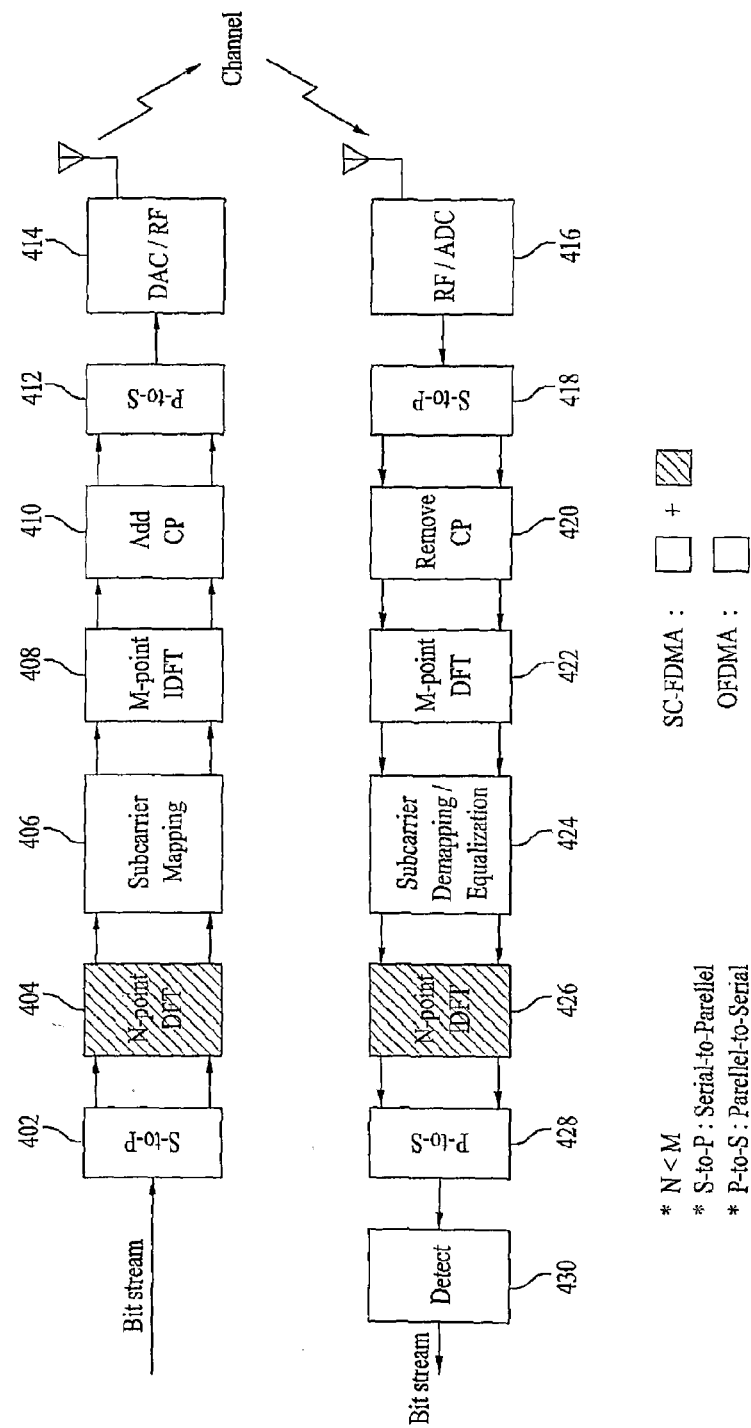
FIG. 4 is a block diagram illustrating a transmitter and a receiver for OFDMA and SC-FDMA.

FIG. 4 is a block diagram illustrating a transmitter and a receiver for OFDMA and SC-FDMA. In the uplink, transmitters 402 to 414 are parts of the user equipment, and receivers 416 to 430 are parts of the base station. In the downlink, the transmitters are parts of the base station, and the receivers are parts of the user equipment.

Referring to FIG. 4, an OFDMA transmitter includes a serial to parallel converter 402, a sub-carrier mapping module 406, an M-point inverse discrete fourier transform (IDFT) module 408, a cyclic prefix (CP) addition module 410, a parallel to serial converter 412, and a radio frequency (RF)/digital to analog converter (DAC) module 414.

A signal processing procedure in the OFDMA transmitter will be described below. First of all, bit streams are modulated to data symbol sequences. The bit streams can be obtained by performing various signal processes, such as channel encoding, interleaving and scrambling, for a data block transferred from the MAC layer. The bit streams may be designated as codewords, and are equivalent to the data block transferred from the MAC layer. The data block transferred from the MAC layer may be designated as a transmission block. Examples of a modulation scheme include, but not limited to, BPSK (binary phase shift keying), QPSK (quadrature phase shift keying), and n-QAM (quadrature amplitude modulation). The data symbol sequences in series are converted to parallel data symbol sequences as much as N (402). N number of data symbols are mapped with N number of subcarrers allocated among a total of M number of subcarriers, and the other M-N number of carriers are padded with 0 (406). The data symbols mapped in a frequency domain are converted to time domain sequences through M-point IDFT processing (S408). Afterwards, in order to reduce inter-symbol interference (ISI) and inter-carrier interference (ICI), cyclic prefix is added to the time domain sequences to generate OFDMA symbols (410). The generated OFDMA symbols are converted from parallel symbols to serial symbols (412). Then, the OFDMA symbols are transmitted to the receiver through digital-to-analog conversion and frequency uplink conversion (414). Other user is allocated with available subcarriers among the remaining M-N number of subcarriers. On the other hand, the OFDMA receiver includes an RF/ADC (analog to digital converter) module 416, a serial-to-parallel converter 418, a cyclic prefix removing module 420, a discrete fourier transform (DFT) module 422, a subcarrier demapping/equalization module 424, a parallel-to-digital converter 428, and a detection module 430. A signal processing procedure of the OFDMA receiver will be configured in reverse order of the OFDMA transmitter.

Meanwhile, as compared with the OFDMA transmitter, the SC-FDMA transmitter additionally includes an N-point DFT module 404 prior to the subcarrier mapping module 406. The SC-FDMA transmitter can reduce a peak-to-average power ratio (PAPR) of a transmitting signal more remarkably than the OFDMA transmitter by spreading a plurality of data to the frequency domain through DFT prior IDFT processing. Also, as compared with the OFDMA receiver, the SC-FDMA receiver additionally includes an N-point IDFT module 426 after the subcarrier demapping module 424. A signal processing procedure of the SC-FDMA receiver will be configured in reverse order of the SC-FDMA transmitter.

In FIG. 4, the transmitter and/or the receiver may further include necessary modules. Some modules/functions may be omitted or may be divided into different modules, and two or more modules may be incorporated into one module.

Figure 5:
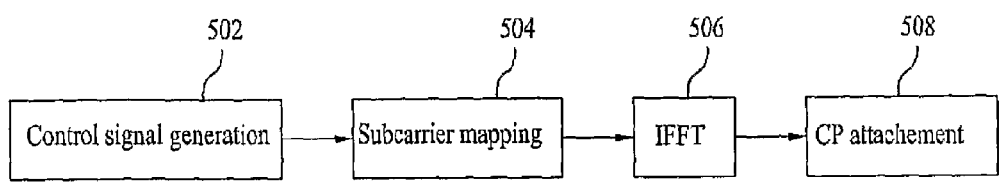
FIG. 5 is a block diagram illustrating a method of generating a control signal in a SC-FDMA transmitter.

FIG. 5 is a block diagram illustrating a method of generating a control signal in a SC-FDMA transmitter.

Referring to FIG. 5, the control signal is directly generated in a frequency domain without through a DFT precoder (502). The, the control signal is mapped with a plurality of subcarriers within the frequency domain (504). The control signal mapped within the frequency domain is converted to a time domain signal through IFFT (506). After cyclic prefix (CP) is added (508), the time domain signal is transmitted to the receiver. The method of generating a control signal illustrated in FIG. 5 can be applied equally when a reference signal (RS or pilot) is generated. The reference signal includes a demodulation reference signal (DMRS), a control channel reference signal, and a sounding reference signal (SRS).

Figure 6:
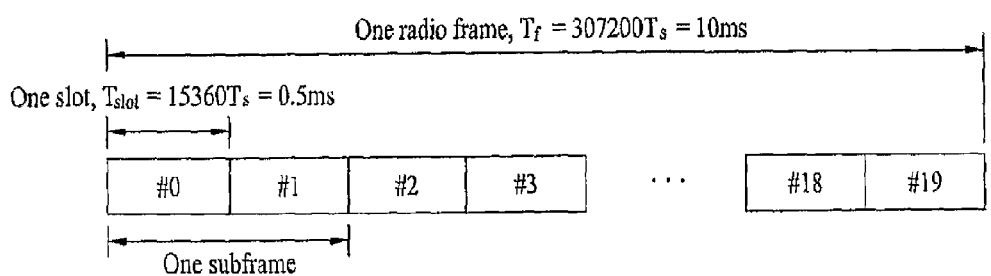
FIG. 6 is a diagram illustrating a structure of a radio frame used in an LTE system.

FIG. 6 is a diagram illustrating a structure of a radio frame used in the LTE system.

Referring to FIG. 6, the radio frame has a length of 10 ms ($327200*T_s$) and includes 10 subframes of an equal size. Each sub frame has a length of 1 ms and includes two slots. Each slot has a length of 0.5 ms ($15360*T_s$). In this case, $T_s$ represents a sampling time, and is expressed by $T_s=1/(15 \text{ kHz}*2048)=3.2552*10^{-8}$ (about 33 ns). The slot includes a plurality of OFDM symbols in a time domain, and includes a plurality of resource blocks (RBs) in a frequency domain. In the LTE system, one resource block includes twelve (12) subcarriers*seven (or six) OFDM symbols. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

Figure 7:
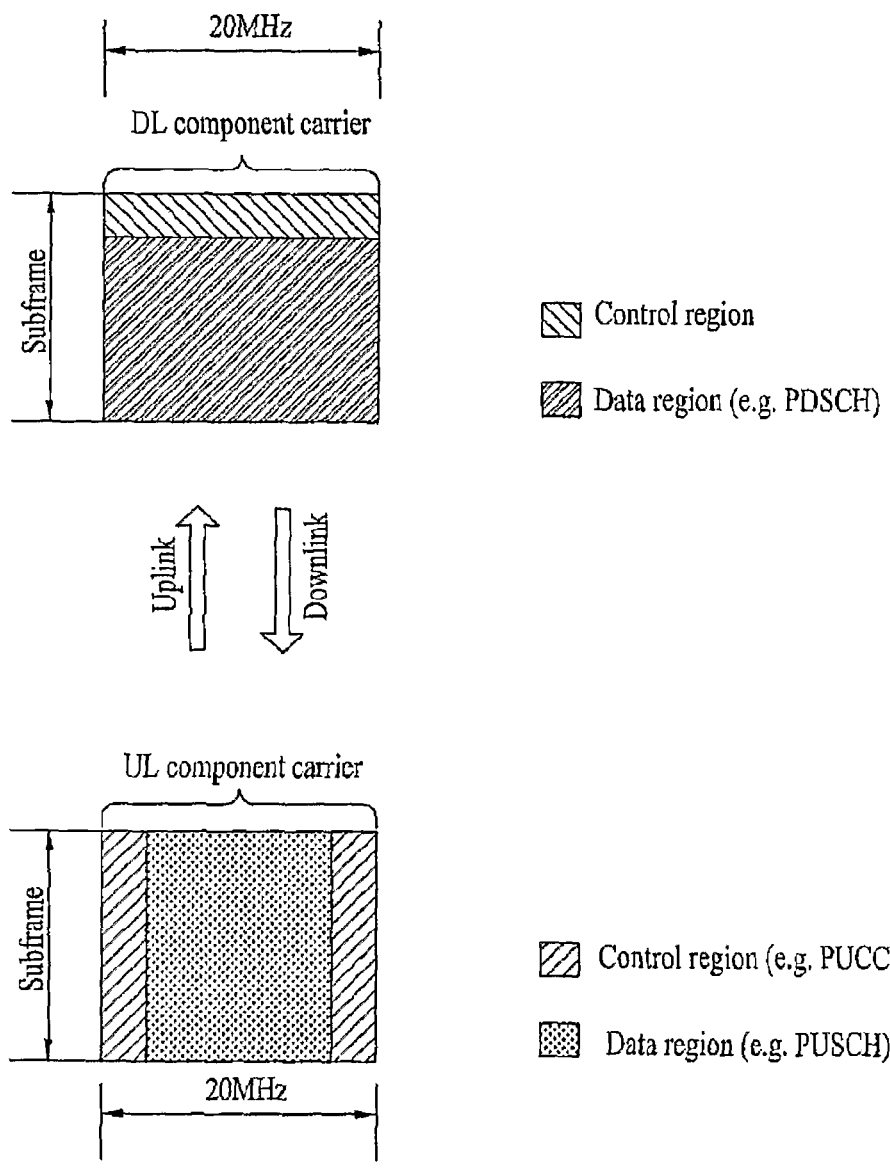
FIG. 7 is a diagram illustrating an example of communication performed under a single component carrier status.

FIG. 7 is a diagram illustrating an example of communication performed under a single component carrier status. FIG. 7 corresponds to a communication example of the LTE system.

Referring to FIG. 7, a general FDD wireless communication system performs data transmission and reception through one downlink band and one uplink band corresponding to the downlink band. The base station and the user equipment can transmit and receive data and/or control information scheduled in a unit of subframe. Structures of downlink and uplink subframes will be described in detail with reference to FIG. 8 and FIG. 9 later. Meanwhile, a radio channel has a fading feature that the channel status is varied irregularly in the time/frequency domains depending on time. The signal transmitted through the radio channel undergoes signal attenuation, phase shift, time delay, etc. Accordingly, the transmitter and the receiver together transmit and receive a reference signal to and from each other when transmitting and receiving data and/or control information to and from each other. Size and phase of the reference signal are known by the transmitter and receiver. The receiver can demodulate data and/or control information using channel information obtained using the reference signal. For example, if data and/or control information is modulated (for example, n-QAM) sing signal strength, data and/or control information is demodulated based on the size of the reference signal.

Figure 8:
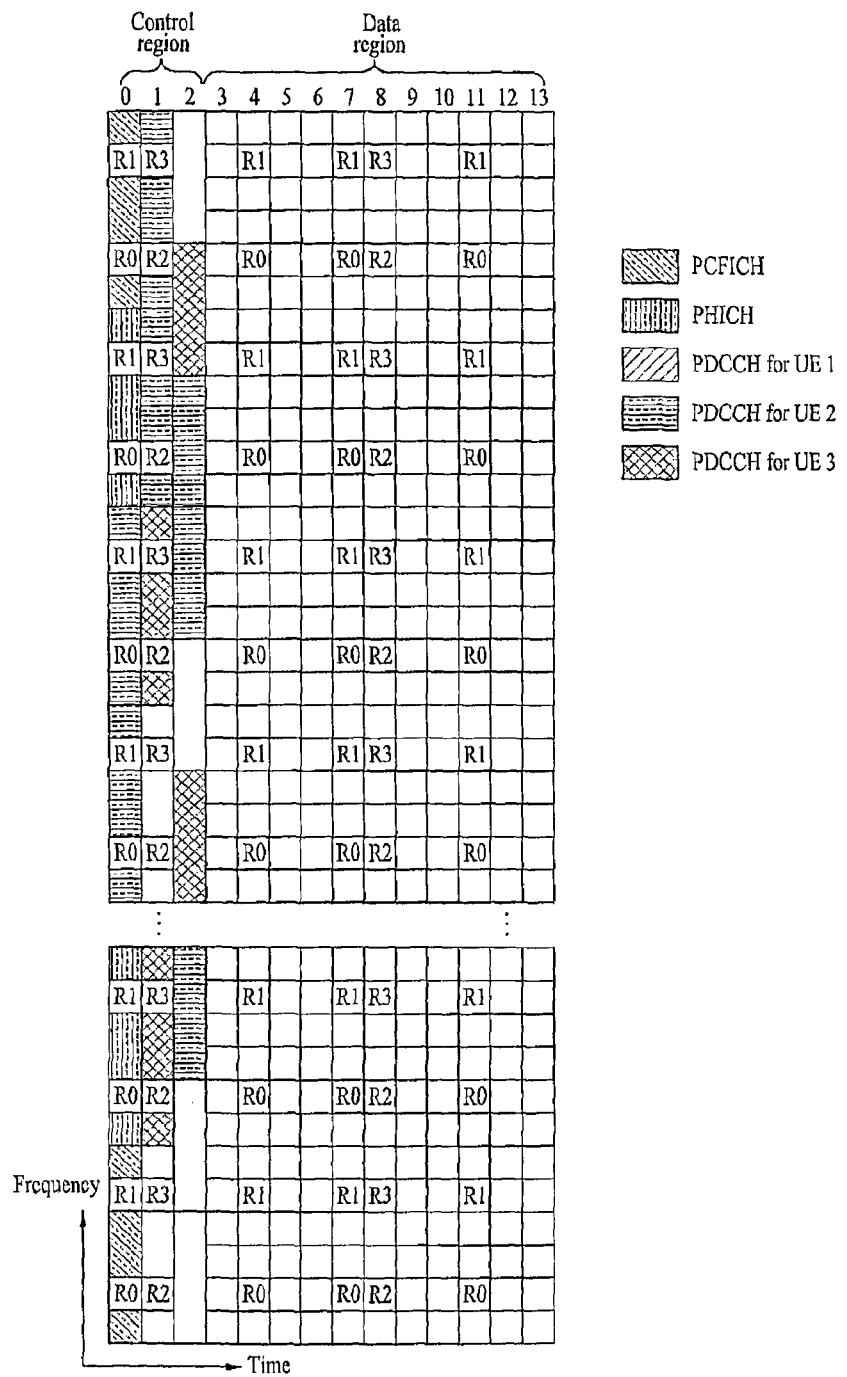
FIG. 8 is a diagram illustrating a structure of a downlink subframe used in an LTE system.

FIG. 8 is a diagram illustrating a structure of a downlink subframe used in an LTE system.

Referring to FIG. 8, the downlink subframe includes a plurality of OFDM symbols (for example, 12 or 14). Maximum three OFDM symbols from the front of the subframe are used as a control region, and the other OFDM symbols are used as a data region. The size of the control region can be set independently per subframe. The control region is used to transmit scheduling information and other control information. The data region is used to transmit downlink traffic. In FIGS. 8, R1 to R4 represent RS of antennas 0 to 3 allocated in accordance with an FDM mode. The RS is fixed within the subframe by a given pattern regardless of the control region and the data region. The control channel is allocated to a resource of the control region, to which RS is not allocated, and the traffic channel is also allocated to a resource of the data region, to which RS is not allocated. The control channel includes a physical control format indicator channel (PCFICH), a physical hybrid-ARQ indicator channel (PHICH), and a physical downlink control channel (PDCCH). The traffic channel includes a physical downlink shared channel (PDSCH). The power of the signal transmitted through the control channel and the traffic channel is determined with reference to the power of the RS of the corresponding antenna.

The control information transmitted through the PDCCH is designated as downlink control information. The DCI includes uplink scheduling information, downlink scheduling information, uplink transmit power control (TPC) command of user equipment group. The uplink/downlink scheduling information includes TPC command of the corresponding user equipment. Specifically, the PDCCH can carry resource allocation and transport format (referred to as downlink grant) of the PDSCH, resource allocation (referred to as uplink grant) of the PUSCH, a set of transmission power control commands of individual user equipments (UEs) within a random user equipment group, and activity of voice over Internet protocol (VoIP). A plurality of PDCCHs can be transmitted to the control region, and the user equipment can monitor the plurality of PDCCHs. The PDCCH includes one or aggregation of several continuous control channel elements (CCEs). The PDCCH of one or aggregation of several continuous CCEs can be transmitted through the control region after subblock interleaving. The CCE is a logical allocation unit used to provide a coding rate according to the status of the radio channel to the PDCCH.

The base station determines a PDCCH format in accordance with DCI to be transmitted to the user equipment, and attaches cyclic redundancy check (CRC) to the control information. CRC is masked with a unique identifier (for example, a radio network temporary identifier (RNTI)) in accordance with owner or purpose of use of the PDCCH. If the PDCCH is for a specific user equipment, CRC can be masked with a unique identifier of the user equipment, for example, cell-RNTI (C-RNTI). If the PDCCH is for a paging message, CRC can be masked with a paging indicator identifier (for example, paging RNTI (P-RNTI)). If the PDCCH is for system information, CRC can be masked with system information identifier (for example, system information-RNTI (SI-RNTI)). CRC can be masked with random access-RNTI (RA-RNTI) to indicate a random access response corresponding to a response to transmission of a random access preamble.

Figure 9A:
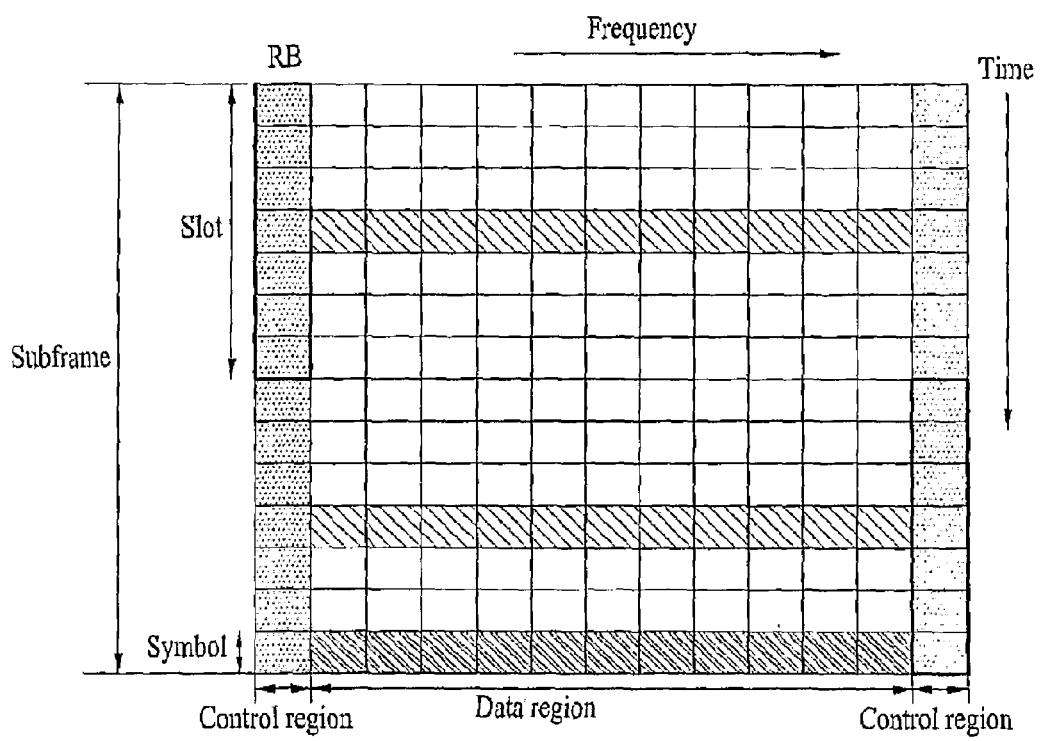
FIG. 9A is a diagram illustrating a structure of an uplink subframe used in an LTE system.

FIG. 9A is a diagram illustrating a structure of an uplink subframe used in an LTE system.

Referring to FIG. 9A, the uplink subframe includes a plurality of slots (for example, two slots). The slot can include a different number of SC-FDMA symbols depending on a CP length. For example, in case of a normal CP, the slot includes seven SC-FDMA symbols. The uplink subframe is divided into a data region and a control region. The data region includes a physical uplink shared channel (PUSCH), and is used to transmit a data signal such as voice and image. The power of the data signal is determined referring to the power of the reference signal included in the same region. For example, the power of the data signal can be determined referring to the power of a demodulation reference signal (DMRS).

The control region includes a physical uplink control channel (PUCCH), and uplink transmits various kinds of control information. The PUCCH includes a pair of resource blocks (RBS) located at both ends of the data region on the frequency axis, and is hopped using the slot as a boundary. The transmission power of the control information is determined referring to the transmission power of the reference signal for the control channel located in the PUCCH. Details of the PUCCH will be described later with reference to FIG. 9B. In the LTE system, the PUSCH and the PUCCH are not transmitted simultaneously to maintain a single carrier feature. Meanwhile, the uplink subframe can transmit a sounding reference signal (SRS). The SRS is located at the last SC-FDMA symbol of the subframe and is transmitted through all or some band of the data region. The transmission power of the SRS can be determined separately from the data signal or the control signal.

Figure 9B:
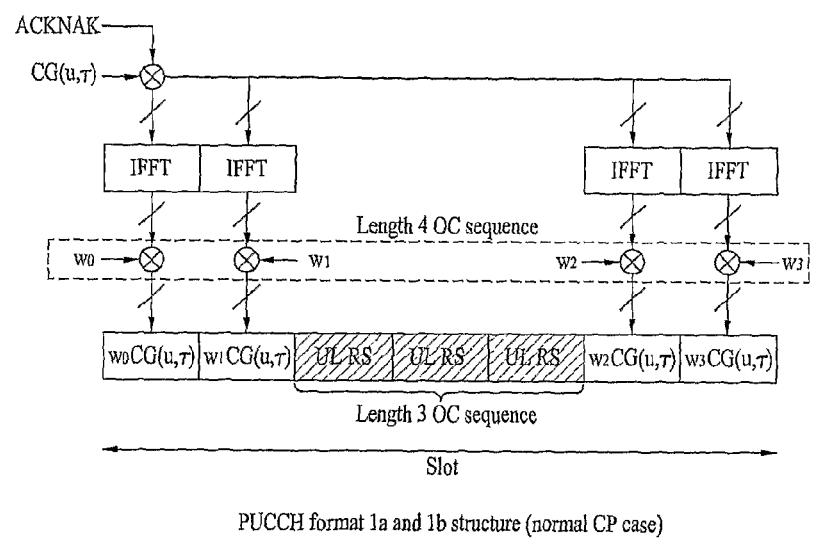
FIG. 9B is a diagram illustrating a structure of an uplink control channel used in an LTE system.

FIG. 9B is a diagram illustrating a structure of an uplink control channel (PUCCH) used in the LTE system.

Referring to FIG. 9B, in case of a normal cyclic prefix (CP), a reference signal (UL RS) is carried in three continuous symbols located in the center of the slot, and control information (i.e., ACK/NACK signals) is carried in the other four symbols. In case of an extended CP, the slot includes six symbols, wherein a reference signal is carried in the third and fourth symbols. The control information can include channel quality indicator (CQI), scheduling request (SR), precoding matrix index (PMI), and rank index (RI) in addition to ACK/NACK. Meanwhile, the transmission power of the control information is determined referring to the transmission power of the reference signal (UL RS) for control channel. In the PUCCH structure, the number and location of UL RSs may be varied depending on types of the control information. However, it is not varied that the transmission power of the control information is determined referring to the transmission power of the UL RS. Resources for control information are identified using different cyclic shifts (CS) (frequency spreading) of computer generated constant amplitude zero auto correlation (CG-CAZAC) sequence and/or different walsh/DFT orthogonal codes (time spreading). w0, w1, w2, w3 multiplied after IFFT obtain the same result even though they are multiplied before IFFT. Orthogonal cover (OC) sequence of a corresponding length may be multiplied by the reference signal.

Meanwhile, for wider frequency bandwidth, the LTE-A system uses carrier aggregation or bandwidth aggregation that uses greater uplink/downlink bandwidths by collecting a plurality of uplink/downlink frequency blocks. Each frequency block is transmitted using a component carrier (CC). Herein, the component carrier may mean a frequency block for carrier aggregation or a center carrier of the frequency block depending on the context. The component carrier and the center carrier may be used together.

Figure 10:
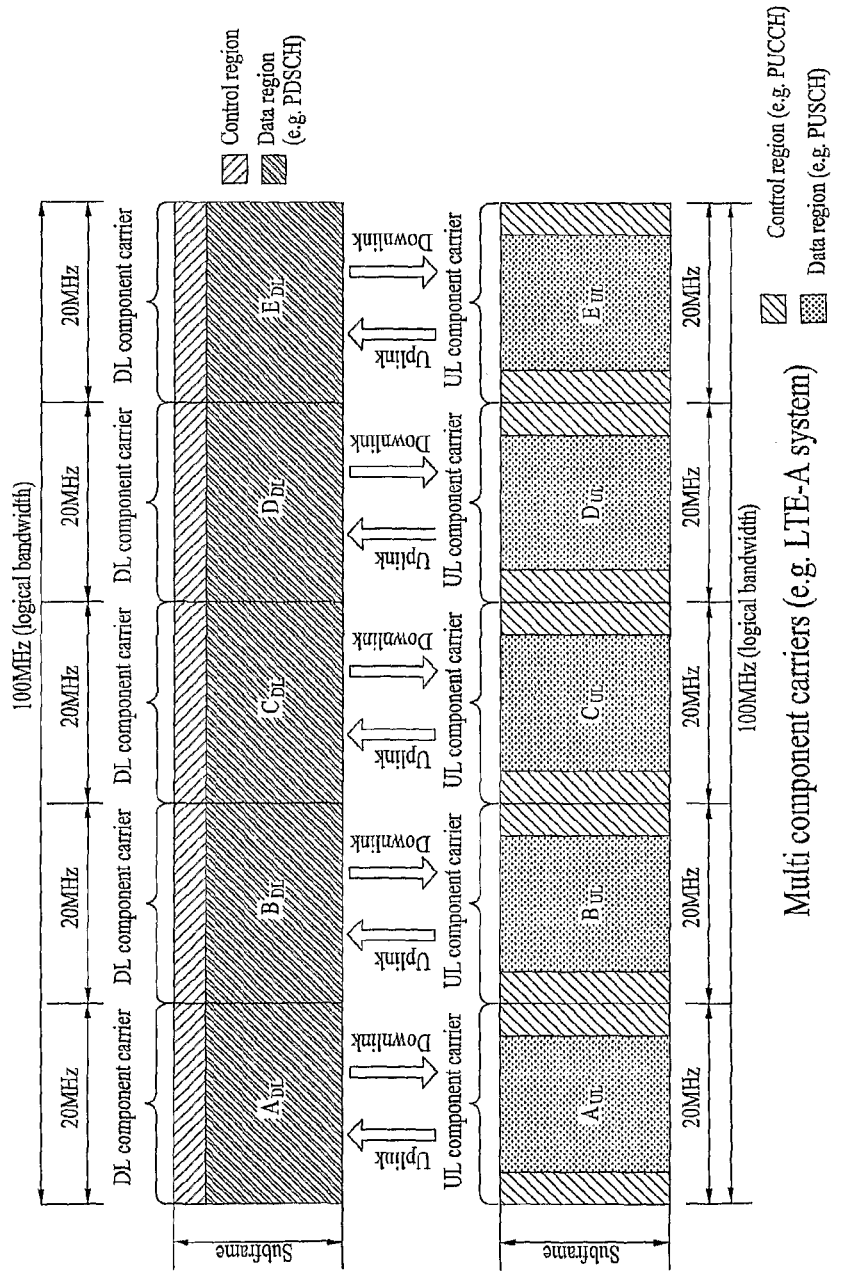
FIG. 10 is a diagram illustrating an example of communication performed under a multi-component carrier status.

FIG. 10 is a diagram illustrating an example of communication performed under multiple component carriers.

Referring to FIG. 10, five component carriers (CCs) of 20 MHz are collected in the uplink/downlink to support a bandwidth of 100 MHz. The respective CCs may adjoin each other in the frequency domain or not. In FIG. 10, the bandwidths of the uplink component carriers are symmetrical to the bandwidth of the downlink component carriers. However, the bandwidths of the respective component carriers may be defined independently. For example, the bandwidths of the uplink component carriers may be configured as 5 MHz ($A_{UL}$)+20 MHz ($B_{UL}$)+20 MHz ($C_{UL}$)+20 MHz ($D_{UL}$)+5 MHz ($E_{UL}$). Also, asymmetrical carrier aggregation where the number of uplink component carriers is different from the number of downlink component carriers may be configured. The asymmetrical frequency bandwidth may occur due to a limit of available frequency band, or may be configured artificially by network establishment. For example, even though N number of CCs are configured in the entire system band, a frequency band that can be received by a specific user equipment can be limited to M(<N) number of CCs. Various parameters of the asymmetrical frequency bandwidth can be set in accordance with a cell-specific scheme, a UE group-specific scheme, or a UE-specific scheme.

In a wireless communication system (for example, LTE-A system), the transmitter can simultaneously transmit a plurality of signals/channels through a single CC or multiple CCs. For example, if the user equipment transmits two PUCCHs from the same subframe, the transmission power (TxP) required for each of the PUCCHs may be varied depending on a radio channel condition or each of the PUCCHs. Particularly, in case of multiple uplink CC aggregation, power control of different CCs may be independent. If the transmission power of each signal is determined by an independent power control operation, two or more signals have different transmission powers, whereby a problem occurs in the operation of the system (for example, DAC).

Figure 11:
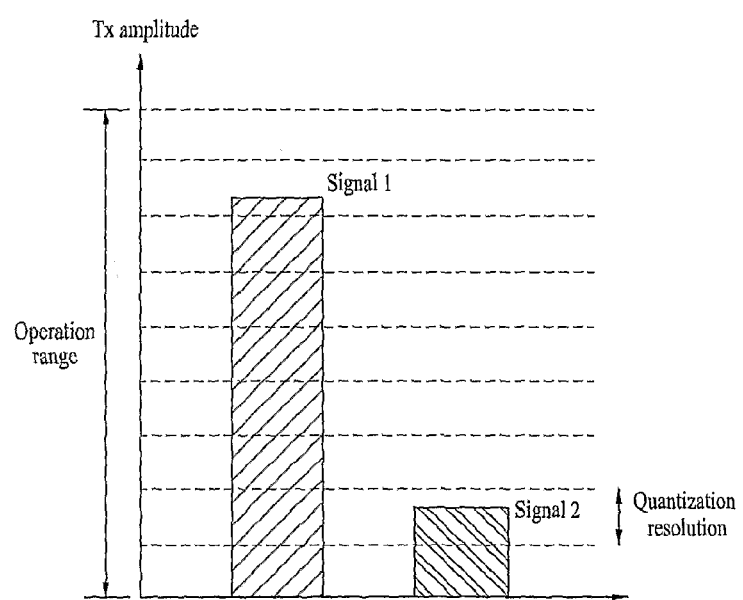
FIG. 11 is a diagram illustrating an example of an operation of a digital-to-analog converter.

FIG. 11 is a diagram illustrating an example of a problem occurring in a digital-to-analog converter (DAC) block (414 of FIG. 4) if a plurality of signals are transmitted.

Referring to FIG. 11, the user equipment can transmit a signal 1 and a signal 2 at the same time. In this case, sum of the signal 1 and the signal 2 corresponding to baseband signals can be input to the DAC block per I/Q components. The value input to the DAC block can be adjusted to conform to the operation range of the DAC. Accordingly, if transmission (Tx) amplitude of the signal 1 is much greater than that of the signal 2, the part of the output value of the DAC block, which corresponds to the signal 1 can be scaled to exist almost over the entire operation range of the DAC block as shown in FIG. 11. In this case, the part of the output value of the DAC block, which corresponds to the signal 2, may not be sufficient to reconstruct baseband waveforms in the receiver. Namely, if the DAC block is operated for the sum of all signals not individual signal, even though the signal 2 having small Tx amplitude is scaled to conform to the operation range of the DAC block, the transmission amplitude of the signal 2 may be relatively smaller than quantization resolution of the DAC block as shown in FIG. 11, whereby a quantization error increases. Although the problem occurring when the plurality of signals are transmitted has been described by using the DAC block for convenience, the problem may occur in various functional blocks for various reasons.

Accordingly, the present invention suggests a method of efficiently controlling transmission power if a transmitter transmits a plurality of signals/(physical) channels at the same time. Specifically, the present invention suggests that the difference in transmission power among the plurality of signals/(physical) channels does not exceed a specific value.

The plurality of signals/(physical) channels mean signals/(physical) channels of which transmission power is independently determined, unless mentioned herein otherwise. For example, the plurality of signals/(physical) channels include signals/(physical) channels associated with their respective reference transmission power. Also, transmission of (physical) channels means that signals are transmitted through (physical) channels. For convenience, signals and (physical)

channels are used to refer to same meaning. The signal is used as a broad concept that includes (physical) channels, unless mentioned otherwise.

Hereinafter, a method of controlling transmission power will be described with reference to FIG. 12 to FIG. 16. For convenience, although FIG. 12 to FIG. 16 have been described in view of the user equipment, this description is exemplary. The description can also be applied to the case that the base station transmits a plurality of signals, by modifications. In the embodiment according to the present invention, the transmission power can be expressed as a linear scale or dB scale. Also, the operation according to the embodiment of the present invention can be performed in a power domain or an amplitude domain.

Figure 12:
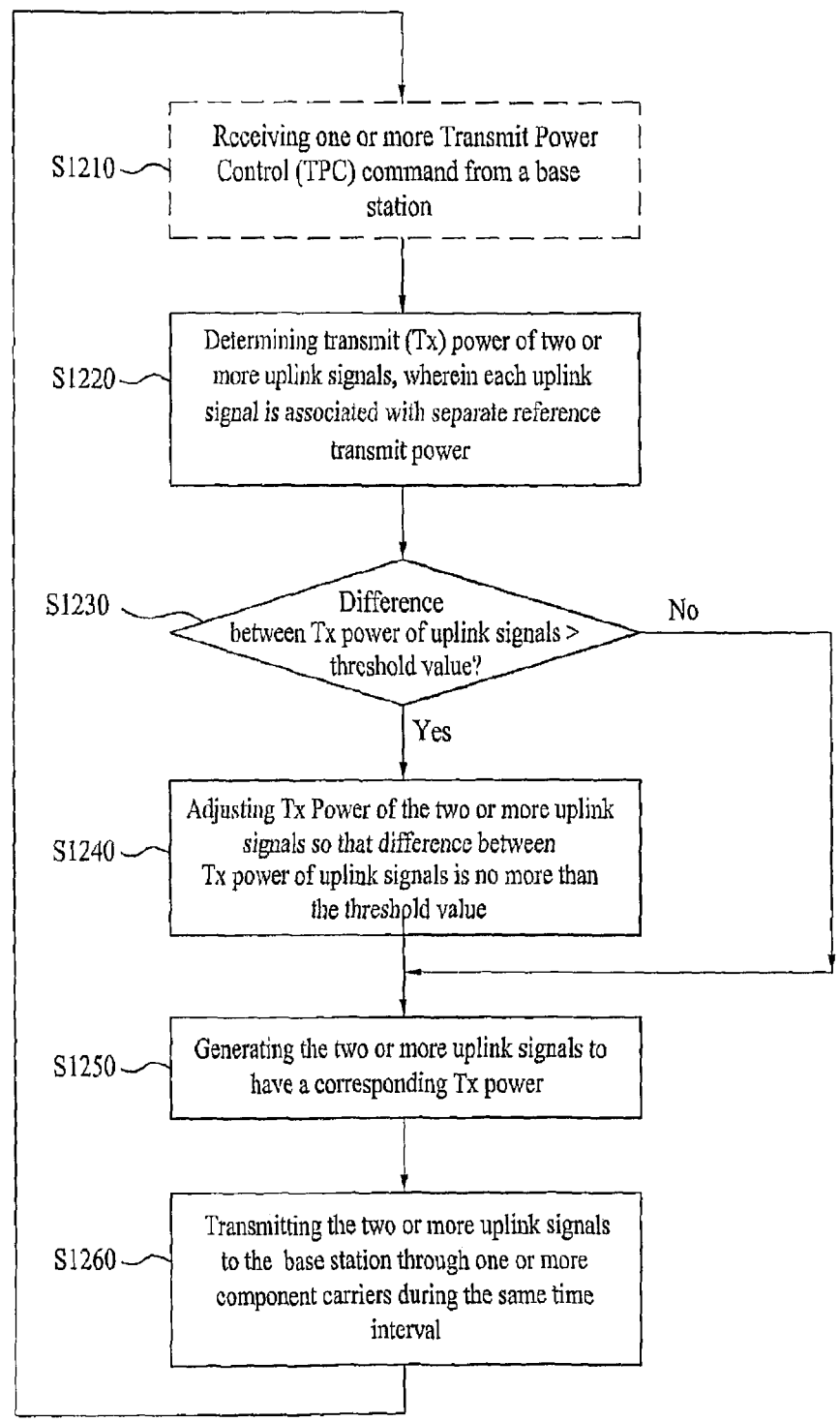
FIG. 12 is a diagram illustrating an example that transmission power is adjusted in accordance with the embodiment of the present invention.

FIG. 12 is a diagram illustrating an example that transmission power is adjusted in accordance with the embodiment of the present invention.

Referring to FIG. 12, the user equipment receives one or more transmission power control (TPC) commands from the base station (S1210). The TPC command can be used to determine the transmission power of each component carrier, the transmission power of a component carrier group, or the transmission power of all component carriers. Also, the TPC command can be used to determine the transmission power of each signal (for example, PUSCH, PUCCH, etc.). The TPC command can be received through a PDCCH of various formats such as a format for downlink scheduling, a format for uplink scheduling, a TPC dedicated format for an uplink data channel (example, PUSCH), and a TPC dedicated format for an uplink control channel (for example, PUCCH).

If there are a plurality of signals to be transmitted to the base station, the user equipment respectively determines the transmission power (TxP) of a plurality of uplink signals (S1220). Each uplink signal can be transmitted using one or more OFDMA symbols or SC-FDMA symbols. Each uplink signal may be associated with reference transmission powers which are separate from one another. The separate reference signals include data demodulation reference signal, control channel reference signal, and sounding reference signal. Although not limited to, the example of transmitting a plurality of signals from the user equipment to the uplink is illustrated in FIG. 13. Referring to FIG. 13, the plurality of signals can be transmitted at the same time using a single component carrier or multiple component carriers. The plurality of signals include a plurality of PUCCHs, a plurality of PUSCHs or a plurality of SRSs (Case 1~3). Also, the plurality of signals may be combination of PUCCH, PUSCH and/or SRS (Case 4~7).

If the uplink transmission power is determined, the user equipment determines whether the difference between uplink transmission powers of the uplink signals is greater than a threshold value (S1230). The threshold value may previously be determined, or may be designated by a cell-specific scheme, a UE group-specific scheme, or a UE-specific scheme. The threshold value may be broadcasted into the cell through a broadcast message (for example, system information) or may be signaled through RRC message. Also, the threshold value can be transmitted to the user equipment through a downlink control channel (for example, PDCCH). The threshold value can be set permanently, semi-permanently, or dynamically. Also, the threshold value can be set differently for different physical channels. Specifically, different threshold values may be set for each combination illustrated in FIG. 13. Also, the threshold value may be set for all component carriers in the same manner, or in a unit of component carrier, or in a unit of component carrier group. Furthermore, the threshold value may be designated differently considering maximum/available power capacity of the user equipment, power level of transmitting signal, etc. The maximum/available power capacity basically depends on physical capability of the user equipment but can be restricted considering permissible power within the cell. The power level of the transmitting signal may be varied depending on the location of the user equipment within the cell, a type of the transmitting signal, etc. For example, since the power level of uplink transmitting signals depends on whether the user equipment is located within the cell or in the boundary of the cell, the fixed threshold value may become relatively greater or less than the power level of the uplink transmitting signals. Accordingly, the threshold value may be varied depending on the size of the power level of the uplink transmitting signals. In this case, the power level of the uplink transmitting signals may be divided into a plurality of blocks and then a proper threshold value may be set for each block. For example, the threshold value may be designated in proportion to the size of the power level of the uplink transmitting signals.

If the difference between the uplink transmission powers is less than the threshold value, the transmission power of the corresponding uplink signal is maintained as it is. On the other hand, if the difference between the uplink transmission powers is greater than the threshold value, the transmission power of the corresponding uplink signals is adjusted to allow the difference between the uplink transmission powers to be less than the threshold value (S1240). The method of adjusting the difference between the transmission powers will be described in detail with reference to FIG. 14 to FIG. 16. Meanwhile, although not shown, the transmission power of the uplink signal can additionally be adjusted considering the maximum/available power capacity of the user equipment. For example, if the sum of the transmission powers adjusted for the uplink signals exceeds the maximum/available power capacity of the user equipment, the transmission power of all or some uplink signals can be lowered. The sum of the transmission powers adjusted for the uplink signals and/or the maximum/available power capacity of the user equipment can be determined based on a specific uplink component carrier or a component carrier group. As the case may be, if it is expected that the sum of the transmission powers adjusted for the uplink signals exceeds the maximum/available power capacity of the user equipment, the threshold values of the steps S1230 and S1240 may be adjusted to have greater values.

If the transmission power of each uplink signal is adjusted, the user equipment generates a plurality of signals having the corresponding transmission power (S1250). Although not limited, the transmission power of the uplink signals can be controlled in the frequency domain prior to IFFT (408 of FIG. 4). In this case, the transmission power can be controlled in a unit of subcarrier. For example, the transmission power can be controlled by multiplying a modulation value mapped with subcarrier by a weight value. The weight value can be multiplied using a diagonal matrix (power diagonal matrix) where each element indicates a value related to the transmission power. In case of the MIMO system, the transmission power can be controlled using a precoding matrix in which a weight value is reflected, or can be controlled by multiplying a precoded modulation value by a power diagonal matrix. Accordingly, even if a plurality of signals are included in the frequency domain to which the same IFFT is applied, the transmission power of each signal can be controlled easily. Also, together with/in addition to the power control in the frequency domain, the transmission power of the uplink signals can be controlled in the time domain after IFFT. Specifically, the transmission power control in the time domain can be performed in various functional blocks. For example, the transmission power control can be performed in the DAC block and/or RF block (414 of FIG. 4). Afterwards, the user equipment transmits the generated uplink signals to the base station through one or more component carriers for the same time interval (S1260). Herein, simultaneous transmission or transmission for the same time interval includes transmission for the same TTI or subframe.

Figure 14:
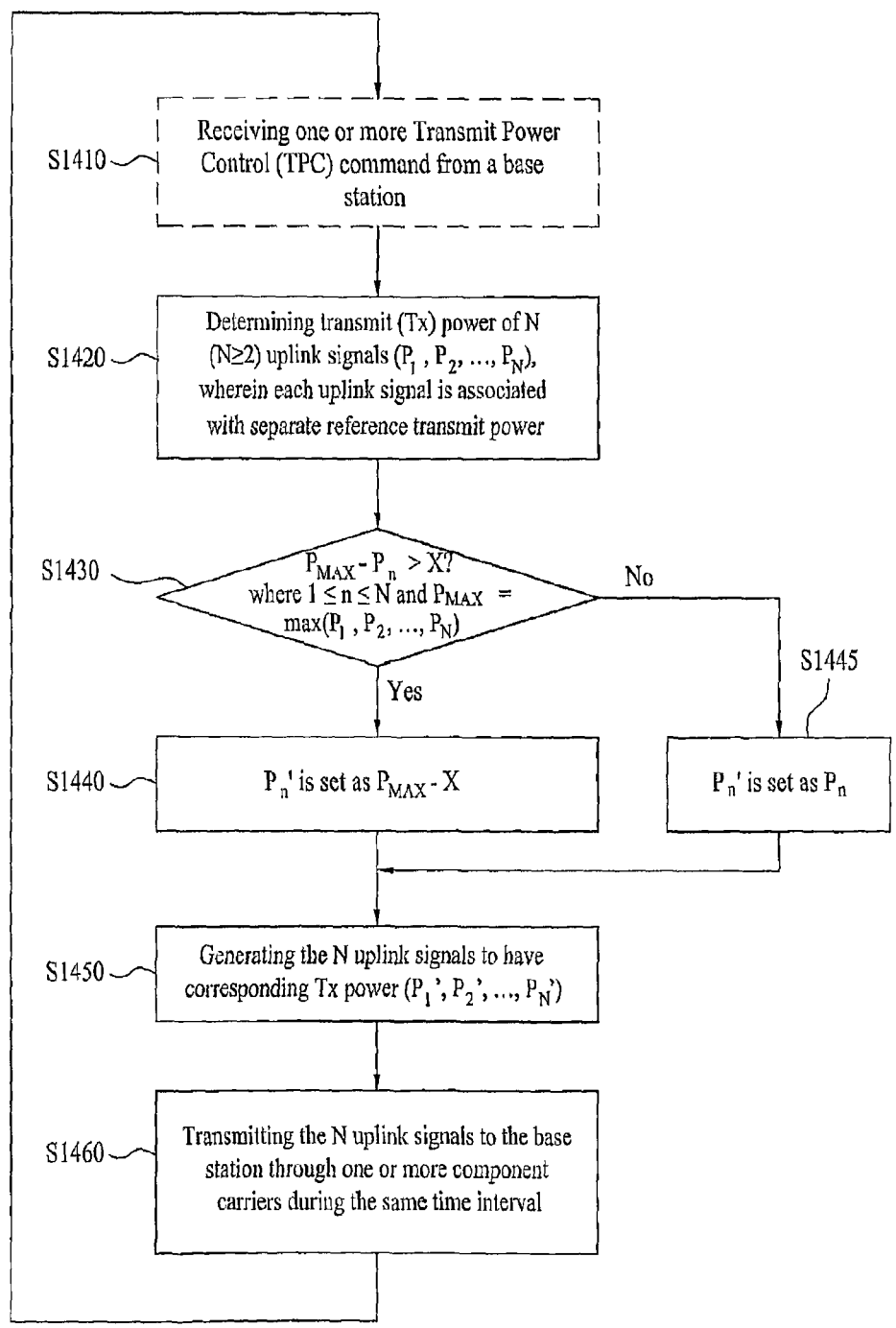
FIG. 14 to FIG. 17 are diagrams illustrating examples that transmission power is adjusted in accordance with the embodiment of the present invention.
Figure 15:
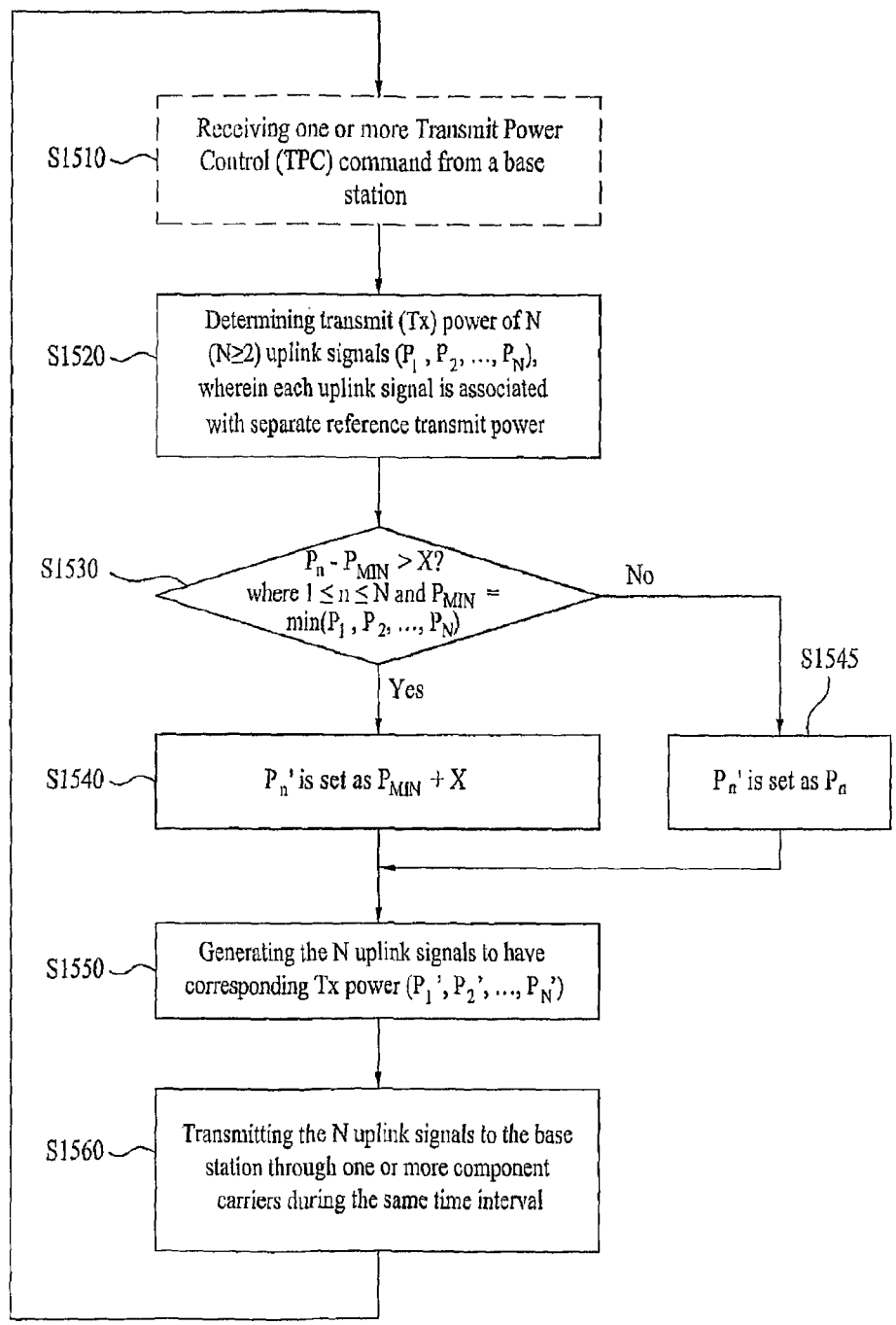
Figure 16:
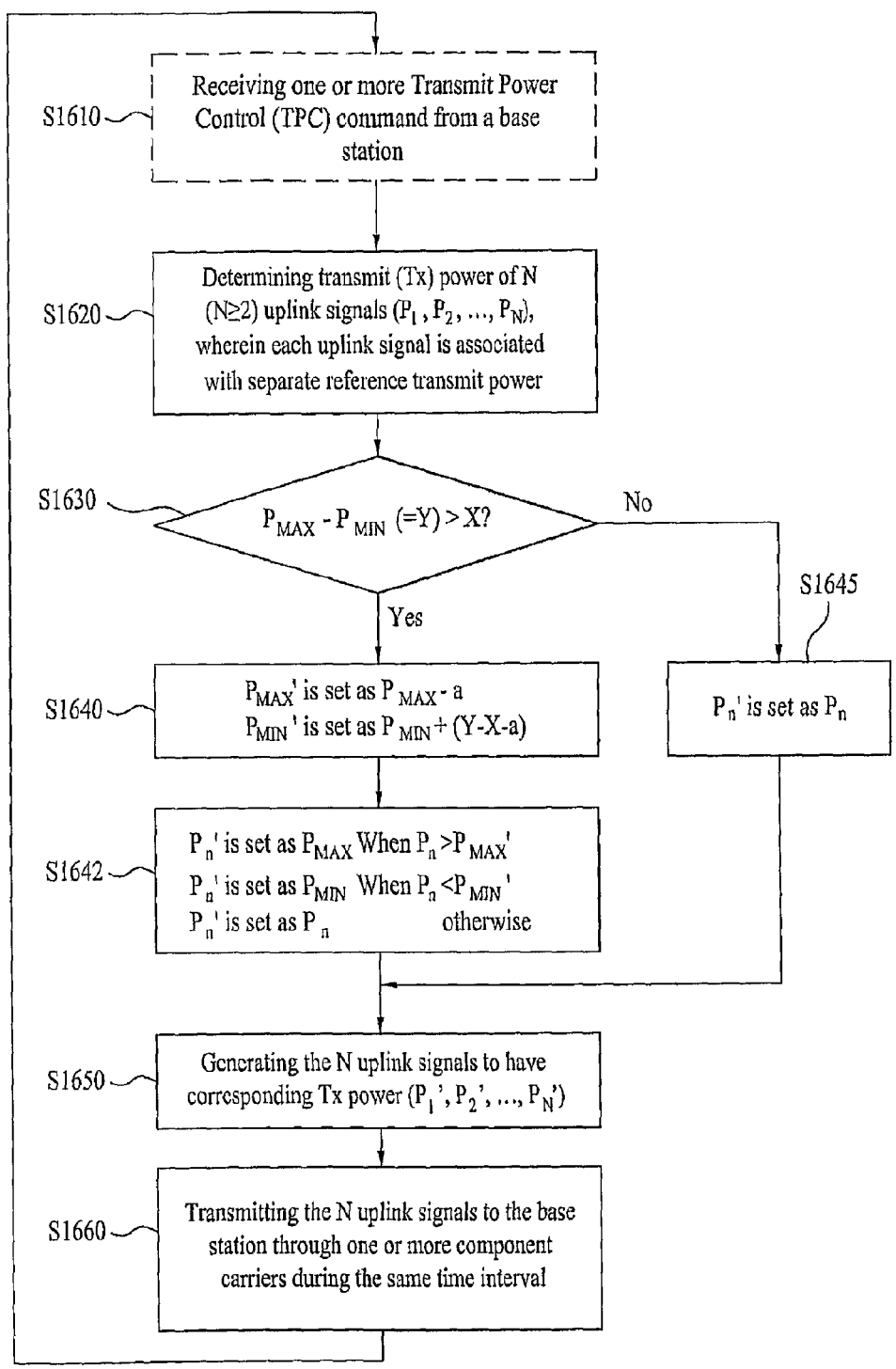

FIG. 14 to FIG. 16 illustrate an example that the transmission power is adjusted in accordance with the embodiment of the present invention. Since basic details of FIG. 14 to FIG. 16 are identical with the description of FIG. 12 and FIG. 13, FIG. 14 to FIG. 16 will be described based on the method of adjusting the difference between the transmission powers. In FIG. 14 to FIG. 16, $P_n$ represents transmission power for the nth signal $S_n$, and $P_n'$ represents transmission power adjusted from $P_n$ in accordance with the embodiment of the present invention. $P_n'$ represents actual transmission power of $S_n$ or a value corresponding to the actual transmission power.

Referring to FIG. 14, if N (N≥2) number of signals $S_1$, $S_2$, ..., $S_N$ should be transmitted at the same time, the user equipment determines transmission powers $P_1, P_2, \ldots, P_N$ of the respective signals in accordance with a general transmission power control operation (S1420). Then, the user equipment determines whether the difference ($P_{MAX}-P_n$) in transmission power between the signal having the greatest transmission power and a certain signal is greater than X (S1430). In this case, n is an integer of 1 to N, and $P_{MAX}$=max $(P_1, P_2, \ldots, P_N)$. If the difference in transmission power between the two signals is greater than X, $P_n'$ is set to $P_{MAX}-X$ (S1440). If not so, $P_n'$ is set to $P_n$ (S1445). For system simplification, the number of signals that can simultaneously be transmitted from the user equipment can be limited to two. If there are two signals $S_1,S_2$ to be transmitted simultaneously and the transmission powers of the respective signals are determined as $P_1$ and $P_2$ in accordance with the general transmission power control operation, power control of each signal can be performed as follows:

in case of $P_1-P_2>X$, $P_1'\leftarrow P_1$ and $P_2'\leftarrow P_1-X$
in case of $P_2-P_1>X$, $P_1'\leftarrow P_2-X$ and $P_2'\leftarrow P_2$
in other cases, $P_1'\leftarrow P_1$ and $P_2'\leftarrow P_2$ In other words, if the difference in transmission power between the signal having the greatest transmission power and the certain signal is greater than X, the signal having less transmission power can be transmitted with the increased power (i.e., transmission power less than the greatest transmission power by X). For this reason, the difference in actual transmission power between the signals is not greater than X. Meanwhile, according to the method illustrated in FIG. 14, actual transmission power of some of the plurality of signals is increased. Accordingly, the sum of the total powers of transmitting signals in all component carriers, component carrier group or specific component group may exceed the maximum/available power capacity of the user equipment. In this case, although not shown, the transmission power of the transmitting signal can be adjusted additionally using the various methods illustrated in S1240 of FIG. 12. According to the method illustrated in FIG. 14, since the actual transmission power of some of the plurality of signals is increased, it is possible to satisfy required performance for all signals. Generally, since it is always required to satisfy required performance for the control signal (for example, PUCCH), the method illustrated in FIG. 14 can be used properly for the control signal, especially.

Referring to FIG. 15, if N (N≥2) number of signals $S_1$, $S_2$, ..., $S_N$ should be transmitted at the same time, the user equipment determines transmission powers $P_1, P_2, \ldots, P_N$ of the respective signals in accordance with a general transmission power control operation (S1520). Then, the user equipment determines whether the difference ($P_n-P_{MIN}$) in transmission power between a certain signal and a signal having the least transmission power is greater than X (S1530). In this case, n is an integer of 1 to N, and $P_{MIN}$=min $(P_1, P_2, \ldots, P_N)$. If the difference in transmission power between the two signals is greater than X, $P_n'$ is set to $P_{MIN}+X$ (S1540). If not so, $P_n'$ is set to $P_n$ (S1545). For system simplification, the number of signals that can simultaneously be transmitted from the user equipment can be limited to two. If there are two signals $S_1,S_2$ to be transmitted simultaneously and the transmission powers of the respective signals are determined as $P_1$ and $P_2$ in accordance with the general transmission power control operation, power control of each signal can be performed as follows:

in case of $P_1-P_2>X$, $P_1'\leftarrow P_2+X$ and $P_2'\leftarrow P_2$
in case of $P_2-P_1>X$, $P_1'\leftarrow P_1$ and $P_2'\leftarrow P_1+X$
in other cases, $P_1'\leftarrow P_1$ and $P_2'\leftarrow P_2$ In other words, if the difference in transmission power between the certain signal and the signal having the least transmission power is greater than X, the signal having great transmission power can be transmitted with the decreased power (i.e., transmission power greater than the least transmission power by X). For this reason, the difference in actual transmission power between the signals is not greater than X. Meanwhile, according to the method illustrated in FIG. 15, since actual transmission power of some of the plurality of signals is decreased, it may not be possible to satisfy required performance for all signals. Generally, since a receiving error of data signal (for example, PUSCH) is compensated by HARQ retransmission, the method illustrated in FIG. 15 can be used properly for the data signal, especially.

Referring to FIG. 16, if N (N≥2) number of signals $S_1$, $S_2$, ..., $S_N$ should be transmitted at the same time, the user equipment determines transmission powers $P_1, P_2, \ldots, P_N$ of the respective signals in accordance with a general transmission power control operation (S1620). Then, the user equipment determines whether the difference ($P_{MAX}-P_{MIN}$) in transmission power between the signal having the greatest transmission power and the signal having the least transmission power is greater than X (S1630). In this case, n is an integer of 1 to N, $P_{MAX}$=max $(P_1, P_2, \ldots, P_N)$ and $P_{MIN}$=min $(P_1, P_2, \ldots, P_N)$. If the difference ($P_{MAX}-P_{MIN}$) in transmission power between the two signals is less than X, $P_n'$ is set to $P_n$ (S1645). Meanwhile, if the difference ($P_{MAX}--P_{MIN}$) in transmission power between the two signals is greater than X, $P_{MAX}'$ is set to $P_{MAX}-a$ and $P_{MIN}'$ is set to $P_{MIN}+(Y-X-a)$ (S1640). Afterwards, $P_n'$ is determined as follows in accordance with the size of $P_n$:

in case of $P_n>P_{MAX}'$, $P_n'\leftarrow P_{MAX}'$ ($=P_{MAX}-a$)
in case of $P_n<P_{MIN}'$, $P_n'\leftarrow P_{MIN}'$ ($=P_{MIN}+Y-X-a$)
in other cases, $P_n'\leftarrow P_n$ In this case, the value 'a' is a real number of 0 to (Y-X). Meanwhile, the value 'a' may be expressed as (Y-X)/b (b is a real number greater than 0). For example, the value 'a' could be (Y-X)/2. Also, although the value 'a' has been defined based on $P_{MAX}$ for convenience, it may be defined based on $P_{MIN}$. In this case, $P_{MAX}'$ may be set to $P_{MAX}-(Y-X-a)$, and $P_{MIN}'$ may be set to $P_{MIN}+a$. The value 'a' (or 'b') may be designated in accordance with a cell-specific scheme, user equipment group-specific scheme, or a user equipment-specific scheme. Information of the value 'a' (or 'b') may be broadcasted into the cell through a broadcast message (for example, system information) or may be signaled through RRC message. Also, the value 'a' (or 'b') can be transmitted to the user equipment through a downlink control channel (for example, PDCCH). The value 'a' (or 'b') can be set permanently, semi-permanently, or dynamically. Also, the value 'a' (or 'b') can be set differently for different physical channels. Specifically, different values 'a' (or 'b') may be set for each combination illustrated in FIG. 13. Also, the value 'a' (or 'b') may be set for all component carriers in the same manner, or in a unit of component carrier, or in a unit of component carrier group. Furthermore, the value 'a' (or 'b') may be designated differently considering maximum/available power capacity of the user equipment, power level of transmitting signal, etc.

Figure 17:
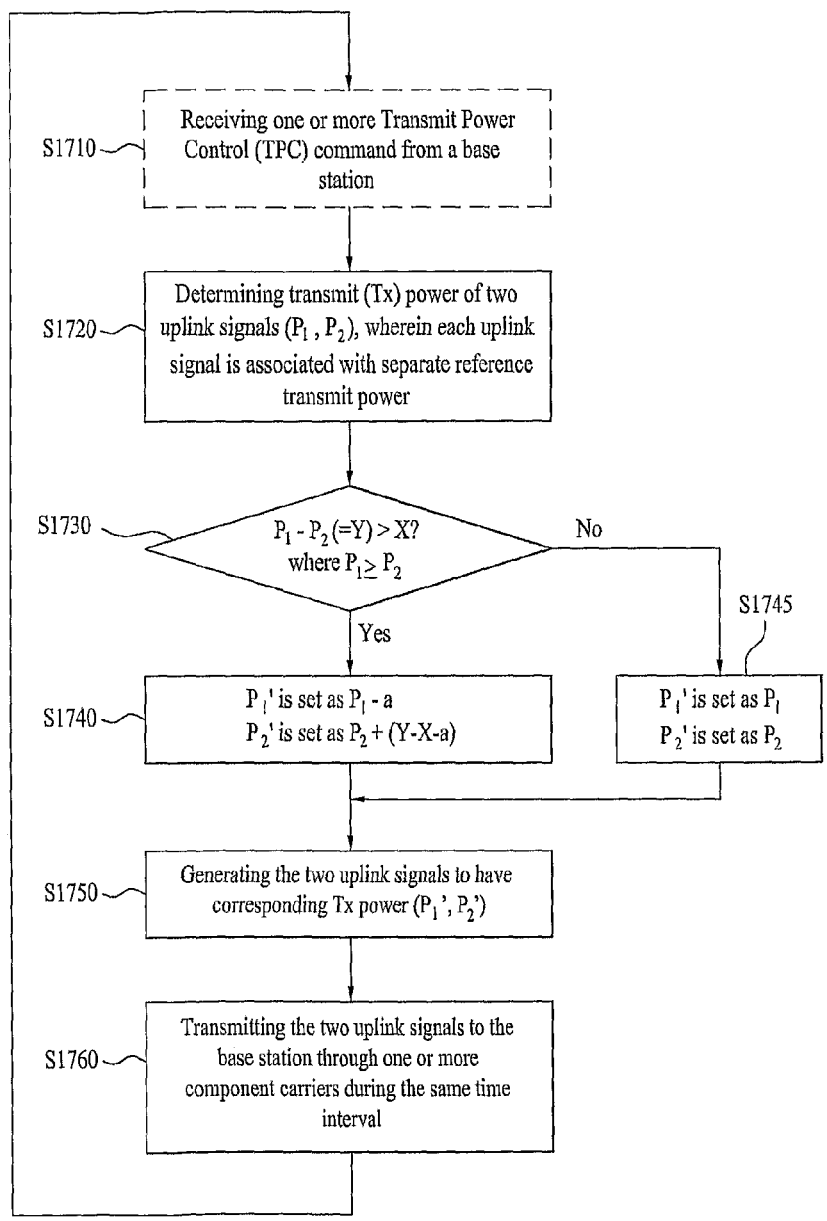

FIG. 17 illustrates that the number of signals that can simultaneously be transmitted from the user equipment is limited to two in the embodiment of FIG. 16. Referring to FIG. 17, if two signals $S_1, S_2$ should be transmitted at the same time, the user equipment determines transmission powers $P_1$, $P_2$ of the respective signals in accordance with a general transmission power control operation (S1720). Then, the user equipment determines whether the difference $(P_1-P_2)$ in transmission power between the two signals is greater than X (S1730). In this case, for convenience, it is assumed that $P_1$ is greater than $P_2$. In opposite case, $P_1$ and $P_2$ are changed to each other in their locations in each step of FIG. 17. Specifically, power control of each signal can be performed as follows:

in case of $P_1-P_2(=Y)>X$, $P_1' \leftarrow P_1-a$ and $P_2' \leftarrow P_2+(Y-X-a)$ (S1740)

in case of $P_2-P_1(=Y)>X$, $P_1' \leftarrow P_1+(Y-X-a)$ and $P_2' \leftarrow P_2-a$ (S1740)

in other cases, $P_1' \leftarrow P_1$ and $P_2' \leftarrow P_2$ (S1745)

In other words, if the difference in transmission power between the two signals is greater than X, the signal having the greater transmission power is transmitted with the decreased power (i.e., transmission power decreased by 'a'), and the signal having the less transmission power is transmitted with the increased power (i.e., transmission power increased by (Y-X-a)). For this reason, the difference in actual transmission power between the signals is not greater than X. In this case, 'a' is the same as that defined in FIG. 16.

Meanwhile, according to the methods illustrated in FIG. 16 and FIG. 17, actual transmission power of some of the plurality of signals is decreased but transmission power of some of the plurality of signals is increased. Accordingly, the sum of the total powers of transmitting signals in all component carriers, component carrier group or specific component group may exceed the maximum/available power capacity of the user equipment. In this case, although not shown, the transmission power of the transmitting signal can be adjusted additionally using the various methods illustrated in S1240 of FIG. 12. According to the methods illustrated in FIG. 16 and FIG. 17, since the actual transmission power of one of the two signals is decreased, it may not be possible to satisfy required performance for all signals. Generally, since a receiving error of data signal (for example, PUSCH) is compensated by HARQ retransmission, the methods illustrated in FIG. 16 and FIG. 17 can be used properly for the data signal, especially.

Figure 18:
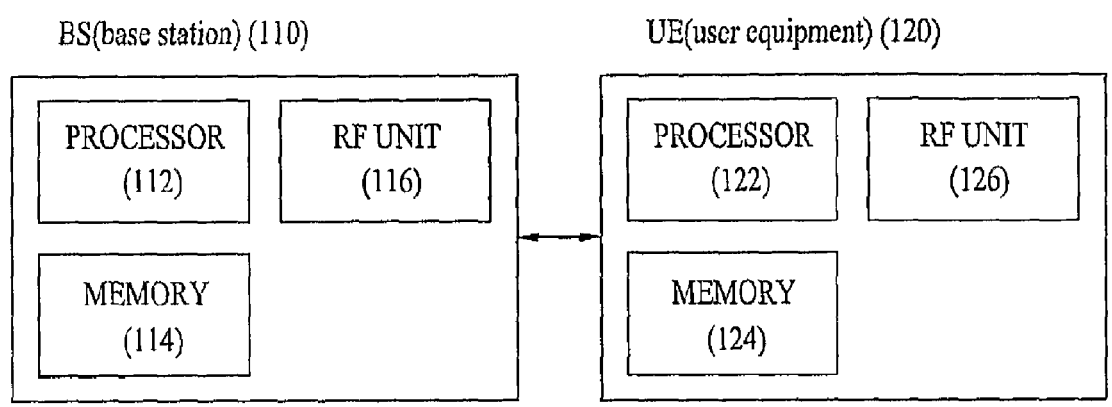
FIG. 18 is a diagram illustrating a base station and a user equipment that can be applied to one embodiment of the present invention.

FIG. 18 is a diagram illustrating a base station and a user equipment that can be applied to one embodiment of the present invention.

Referring to FIG. 18, the wireless communication system includes a base station (BS) 110 and a user equipment (UE) 120. In the downlink, the transmitter is a part of the base station 110 and the receiver is a part of the user equipment 120. In the uplink, the transmitter is a part of the user equipment 120 and the receiver is a part of the base station 110. The base station 110 includes a processor 112, a memory 114, and a radio frequency (RF) unit 116. The processor 112 can be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 can have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention can be applied to a method and apparatus of controlling transmission power of a plurality of signals.

What is claimed is:

1. A method of transmitting signals at a user equipment (UE) of a wireless communication system, the method comprising:
    determining, by the UE, a first transmission (Tx) power $P_n$ of a physical uplink channel when transmission (Tx) timings of plural physical uplink channels coincide at a subframe, the plural physical uplink channels including the physical uplink channel;
    adjusting, by the UE the first Tx power $P_n$ to obtain a second Tx power $P_n'$ of the physical uplink channel; and
    transmitting, by the UE, the physical uplink channel using the second Tx power $P_n'$,
    wherein $P_n'$ is set as follows:
        if $(P_n - P_{MIN}) > X$, then $P_n'$ is set as $P_{MIN} + X$,
        if $(P_n - P_{MIN}) <= X$, then $P_n'$ is set as $P_n$,
    wherein $P_{MIN}$ is a minimum Tx power among Tx powers of the plural physical uplink channels, and X is a predetermined value, and
    wherein $P_n$ is not a maximum Tx power among the Tx powers of the plural physical uplink channels.

2. The method of claim 1, wherein the physical uplink channel is transmitted through one or more single carrier frequency division multiple access (SC-FDMA) symbols.

3. The method of claim 1, wherein the plural physical uplink channels respectively include separate reference signals.

4. The method of claim 1, wherein the plural physical uplink channels respectively include any one of a physical uplink shared channel (PUSCH) signal, a physical uplink control channel (PUCCH) signal, and a sounding reference signal (SRS).

5. A user equipment of a wireless communication system, the user equipment comprising:
    a radio frequency (RF) device connected with a processor and configured to transmit and receive a radio signal to and from a base station;
    a the memory connected with the processor and storing information transmitted to and received from the base station and parameters required for an operation of the user equipment; and
    the processor connected with the RF unit and the memory, and controlling the RF device and the memory for the operation of the user equipment,
    wherein the processor is configured to
        determine a first transmission (Tx) power $P_n$ of a physical uplink channel when Tx timings of plural physical uplink channels coincide at a subframe, the plural physical uplink channels including the physical uplink channel,
        adjust the first Tx power $P_n$ to obtain a second Tx power $P_n'$ of the physical uplink channel, and
        transmit the physical uplink channel using the second Tx power $P_n'$, wherein $P_n'$ is set as follows:
            if $(P_n - P_{MIN}) > X$, then $P_n'$ is set as $P_{MIN} + X$,
            if $(P_n - P_{MIN}) <= X$, then $P_n'$ is set as $P_n$,
    wherein $P_{MIN}$ is a minimum Tx power among Tx powers of the plural physical uplink channels, and X is a predetermined value, and
    wherein $P_n$ is not a maximum Tx power among the Tx powers of the plural physical uplink channels.

6. The user equipment of claim 5, wherein the physical uplink channel is transmitted through one or more single carrier frequency division multiple access (SC-FDMA) symbols.

7. The user equipment of claim 5, wherein the plural physical uplink channels respectively include separate reference signals.

8. The user equipment of claim 5, wherein the plural physical uplink channels respectively include any one of a physical uplink shared channel (PUSCH) signal, a physical uplink control channel (PUCCH) signal, and a sounding reference signal (SRS).

* * * * *